United States Patent
Karube et al.

[11] Patent Number: 5,379,316
[45] Date of Patent: Jan. 3, 1995

[54] LASER DISCHARGE TUBE

[75] Inventors: Norio Karube, Machida; Yoshiki Fujioka, Minamitsuru; Mitsuo Manabe, Hachioji, all of Japan

[73] Assignee: Fanuc Ltd., Minamitsuru, Japan

[21] Appl. No.: 30,418

[22] PCT Filed: Jun. 11, 1992

[86] PCT No.: PCT/JP92/00750
§ 371 Date: Mar. 23, 1993
§ 102(e) Date: Mar. 23, 1993

[87] PCT Pub. No.: WO93/03520
PCT Pub. Date: Feb. 18, 1993

[30] Foreign Application Priority Data

Jul. 29, 1991 [JP] Japan .................... 3-187968

[51] Int. Cl.6 .................... H01S 3/03; H01S 3/097
[52] U.S. Cl. .................... 372/61; 372/87; 372/88
[58] Field of Search .................... 372/87, 88, 61

[56] References Cited

U.S. PATENT DOCUMENTS

| | | | |
|---|---|---|---|
| 4,752,935 | 6/1988 | Beck | 372/55 |
| 4,800,562 | 1/1989 | Karube | 372/87 |
| 4,802,184 | 1/1989 | Karube | 372/61 |

FOREIGN PATENT DOCUMENTS

| | | |
|---|---|---|
| 0382510 | 8/1990 | European Pat. Off. |
| 57-2588 | 1/1982 | Japan |
| 61-219191 | 9/1986 | Japan |
| 63-98163 | 4/1988 | Japan |
| 166983 | 3/1989 | Japan |

Primary Examiner—Georgia Y. Epps
Attorney, Agent, or Firm—Staas & Halsey

[57] ABSTRACT

A laser discharge tube for preventing the flow out of an electrode material, deterioration of electrodes, and the like, caused by corona discharge, as well as for increasing power to be supplied to the laser discharge tube by improving the heat-dissipating property and insulating property of the electrodes. The laser discharge tube is a tube of a dielectric material (e.g., silica glass) with a circular cross section and two electrode units are helically disposed on the outside periphery thereof at the same pitch. The electrode units include electrodes and dielectric layers, respectively, and each of the electrodes is formed by depositing silver as an electric conductor on the outside periphery of the tube wall by metalizing. The dielectric layers are formed to cover the electrodes, respectively, and are disposed on the outside periphery of the tube wall by depositing a dielectric material such as a ceramic material, glass, resin or the like by spray coating, coating, baking or the like or by bonding independently formed dielectric materials to the electrodes. The dielectric layers have a thickness of about 0.1 mm–5 mm.

16 Claims, 2 Drawing Sheets

LASER DISCHARGE TUBE

TECHNICAL FIELD

The present invention relates to a laser discharge tube used in a laser oscillator, and more specifically, to a laser discharge tube by which the dielectric breakdown and the like of the electrodes disposed on the outside periphery of a tube wall of the discharge tube are prevented.

BACKGROUND ART

A discharge tube used in a laser oscillator induces a discharge in response to a high voltage applied thereto and outputs a laser beam produced by a laser gas excited by the discharge to the outside. Incidentally, the high voltage is applied to electrodes disposed on the outside periphery of the tube wall of the discharge tube and the discharge takes place between the electrodes confronting each other across the discharge tube. Therefore, a discharge normally takes place within a region determined by the width of the electrodes.

Nevertheless, since a very high high-frequency voltage (e.g., 4000 V) is applied to the electrodes, there is a possibility that a dielectric breakdown is caused in the region other than the region between the electrodes and a corona discharge takes place. The corona discharge is liable to take place at the portion of the discharge tube having a high temperature such as, for example, at the downstream of a laser gas flowing in the discharge tube and the temperature of the portion where the corona discharge takes place is increased and thus an electrode material is eroded and separated by being melted so that the deterioration of the electrode material is rapidly accelerated.

By the way, silver, having a good electric conductivity, is generally used as the electrode material. The electrodes are formed by depositing the silver on the outside wall of the discharge tube by metalizing or the like. Further, when a high voltage is applied to the electrodes, the edge portion of each electrode has a distribution of a strong field and thus corona discharge takes places. When the electrodes are lifted by thermal strain or the like and an air gap is created, corona discharge also takes place at the lifted portion. The corona discharge travels once along the surface of the outside wall of the discharge tube and then gets into the discharge tube at a position apart from the electrodes by several millimeters. At the time, the silver is flown out by reacting with water and the flown silver grows to a tree-branch-shape along the outside wall of the discharge tube from the electrodes and covers the outside wall of the discharge tube in the vicinity of the electrodes with a width of several centimeters. When such a phenomenon occurs in which the silver serving as the electrode material migrates, a dielectric strength is further lowered and corona discharge is more liable to take place, and as a result, the flow-out of the electrode material and deterioration of the electrodes, and the like become more significant. Further, since the vicinity of the electrodes is covered with the melted silver, the width of the electrodes is increased to change the electric characteristics thereof, and the life of the discharge tube is also shortened. In addition, the external appearance of the discharge tube becomes poor.

Although it suffices to lower a voltage applied to the electrodes for the prevention of the corona discharge, this leads to a reduction of power to be supplied and a laser beam machining requiring high power cannot be executed. Further, since corona discharge is liable to take place as the temperature of the electrodes increases, there is a method of lowering the temperature of the electrodes by the provision of heat-dissipating plates with the electrodes. However, the occurrence of corona discharge cannot be prevented at the downstream of a laser gas where the temperature of the discharge tube is increased. Further, although the temperature may be lowered by lowering an applied voltage, power to be supplied is also lowered in this case as described above, and a laser beam machining requiring a large amount of power cannot be executed.

DESCRIPTION OF THE RELATED ART

Taking the above into consideration, an object of the present invention is to provide a laser discharge tube capable of preventing the flow out and separation of an electrode material and deterioration of electrodes, and the like, caused by corona discharge.

Further, another object of the present invention is to provide a laser discharge tube capable of increasing power to be supplied by improving the heat-dissipating property and insulating property of the electrodes.

To attain the above objects, according to the present invention, there is provided a laser discharge tube for inducing a discharge in response to a high frequency voltage applied thereto and exciting a laser gas, which comprises electrodes mounted on the outside periphery of a tube wall of the discharge tube and dielectric layers deposited on the electrodes.

The dielectric layers are formed by being deposited on the electrodes disposed on the outside periphery of the tube wall by coating or bonding so that the dielectric layers cover the electrodes. The dielectric layers can prevent the occurrence of corona discharge conventionally induced at the ends of the electrodes, and thus the flow out and separation of the electrode material, deterioration of the electrodes, and the like can be prevented. Further, since the heat-dissipating property and the insulating property of the electrodes are improved by using a material having a high coefficient of thermal conductivity and high insulating property for the dielectric layers, power to be supplied to the laser discharge tube can be increased.

BEST MODE OF CARRYING OUT THE INVENTION

An embodiment of the present invention will be described below with reference to the drawings.

Figure 2:
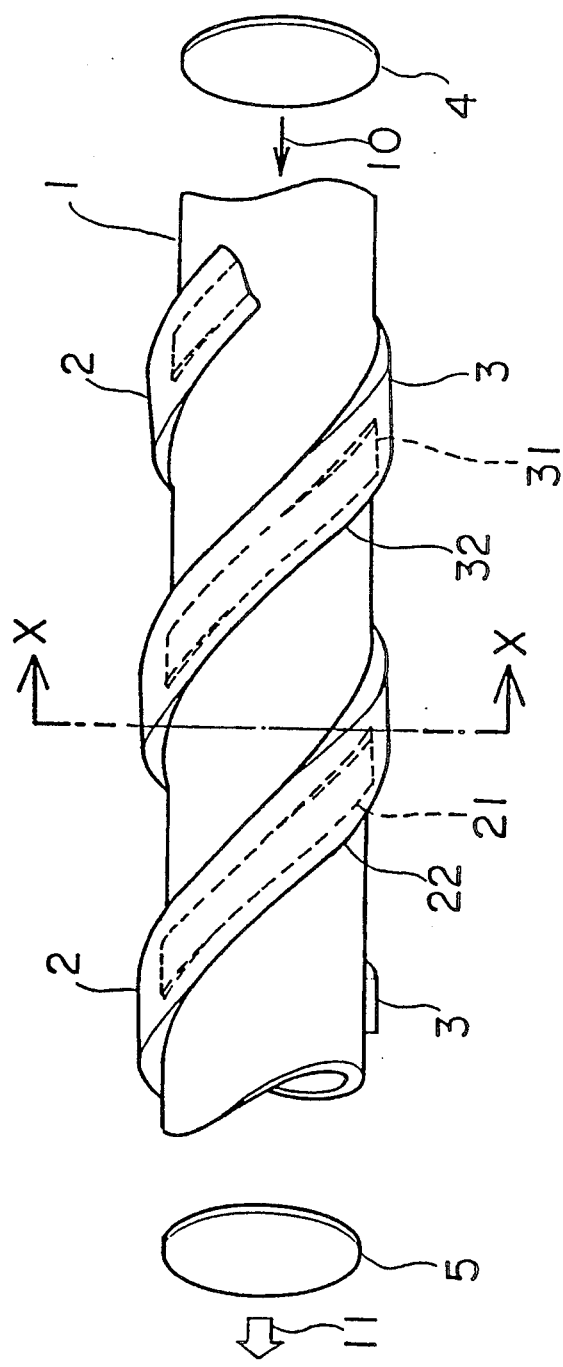
FIG. 2 is a diagram schematically showing the arrangement of a laser oscillator using the laser discharge tube according to the present invention.

FIG. 2 is a diagram schematically showing the arrangement of a laser oscillator using the laser discharge tube according to the present invention. A laser discharge tube 1 is a tube with a circular cross section comprising a dielectric material (e.g., quartz). Two electrode units 2, 3 are helically disposed on the outside periphery of the laser discharge tube 1 at the same pitch. The electrode unit 2 comprises an electrode 21 and a dielectric layer 22 and the electrode unit 3 is comprises an electrode 31 and a dielectric layer 32, in the same way. The details thereof will be described later. A laser gas 10 flows in the laser discharge tube I in the direction of a tube axis indicated by an arrow, and when a high-frequency voltage is applied between the electrodes 21 and 31 from a high-frequency power supply (not shown), a discharge takes place in the laser discharge tube 1 between the electrodes confronting each other across the discharge tube 1 and the laser gas 10 is excited. A totally reflecting mirror 4 and output coupling mirror 5 are disposed at the opposite ends of the laser discharge tube 1 to constitute a Fabry-Perot reflector and a beam discharged from the molecules of the excited laser gas is oscillated and a part thereof is output from the output coupling mirror 5 as a laser beam 11. The laser beam 11 is irradiated to a workpiece for the laser machining thereof. Note, the laser discharge tube 1 may comprises other dielectric materials (e.g., alumina, aluminium titanate) resistant to dielectric breakdown in addition to quartz. Further, although the electrodes are helically disposed to the laser discharge tube 1, plate-shaped electrodes may be disposed thereto.

Figure 1:
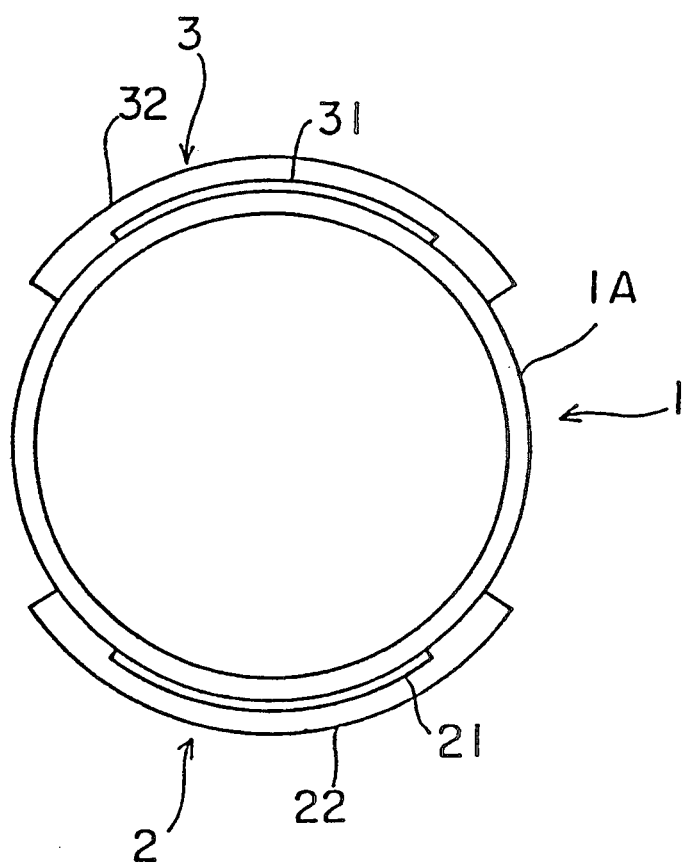
FIG. 1 is a diagram showing the arrangement of a laser discharge tube according to the present invention.

FIG. 1 shows the arrangement of the laser discharge tube according to the present invention, which is a cross sectional view taken along the line X—X of FIG. 2. As described above, the electrode units 2 and 3 are disposed on the outside periphery 1A of the tube wall of the laser discharge tube 1. The respective electrodes 21 and 31 of the electrode units 2 and 3 are formed by depositing silver as a conductor on the outside periphery 1A of the tube surface. The dielectric layers 22 and 32 are formed to cover the electrodes 21 and 31. The dielectric layers 22 and 32 are formed on the electrodes 21 and 31 disposed on the outside periphery 1A of the tube wall by depositing a dielectric material such as a ceramic materiaL, glass, resin or the Like by spray coating, coating, baking or the Like or by bonding independently formed dielectric materials to the electrodes 21 and 31, and have a thickness of about 0.1 mm–5 mm.

Here, a case will be described in which the dielectric layers 22 and 32 comprise a ceramic material having a low coefficient of thermal expansion or negative coefficient of thermal expansion and a low melting point glass is used as a binder. A lead oxide material comprising of lead oxide added with $B_2O_3$ ($PbO. B_2 O_3$) is used as a typical low melting point glass, and aluminium titanate ($AL_2TiO_5$), boron nitride (BN) and silicon nitride ($Si_3N_4$) are used as the ceramic material.

The lead oxide ($PbO.B_2 O_3$) has a melting point of about 400° C.–450° C. which is lower than that of the silver forming the electrodes 21 and 31 and thus it is suitably coated and baked to the electrodes 21 and Further, the lead oxide also has the function of flowing into an air gap and returning to its original state at the initial stage of an air gap discharge caused by the lifting of the electrodes 21 and 31 due to thermal strain before the electrodes 21 and 31 are melted and broken. A mixing ratio of the lead oxide to the entire material is 50–90 wt %.

Aluminium titanate and boron nitride have a negative coefficient of thermal expansion and serve to lower the coefficient of thermal expansion of the entire material by being mixed with the lead oxide. A mixing ratio of them to the entire material is adjusted so that a resulting coefficient of thermal expansion is substantially equal to the coefficient of thermal expansion of the laser discharge tube 1 and, for example, the aluminium titanate has the mixing ratio of 18 wt % and the boron nitride has the mixing ratio of 5 wt %. Further, since the aluminium titanate and boron nitride have a coefficient of thermal conductivity higher than that of the low melting point glass, a coefficient of thermal conductivity as a whole is increased. In particular, since the boron nitride has a large coefficient of thermal conductivity, a heat-dissipating property can be greatly improved by mixing the boron nitride. Note, the addition of a slight amount (e.g., 2 wt %) of the silicon nitride enables the ceramic material to be easily coated to the laser discharge tube 1. Silicon carbide may be used in place of the silicon nitride to obtain the same effect.

The above lead oxide, aluminium titanate, boron nitride and silicon nitride are mixed together with a solvent and coated to the electrodes 21 and 31 of the laser discharge tube 1 and further baked in a thermostat. The baking conditions thereof are, for example, 450° C. for 30 minutes.

The electrodes 21 and 31 are completely covered with the thus made ceramic-deposited-layers (dielectric layers) 22 and 32, respectively. As a result, the silver is prevented from being melted by coming into contact with water and reacting with it. Further, air gaps conventionally interposed between the electrodes 21 and 31 and the outside periphery 1A of the tube wall are removed and there is no chance that corona discharge conventionally excited by the air gaps takes place. Further, since the lifted air gaps caused by the thermal strain between the laser discharge tube 1 and the electrodes 21 and 31 are returned to their original state, there is also no chance for corona discharge to take place there. Therefore, the flow out and separation of the silver constituting the electrodes 21 and 31, deterioration of the electrodes 21 and 31, and the like can be prevented and the life of the laser discharge tube 1 is prolonged more than ten times. Further, the characteristics of the laser discharge tube 1 are not deteriorated (changed) by the silver flowing out to the vicinity of the electrodes and covering them. Furthermore, the external appearance of the discharge tube is not made poor.

Further, since the ceramic-deposited-layers 22 and 32 have a coefficient of thermal expansion adjusted to be substantially equal to that of the laser discharge tube 1, the thermal strain produced between the ceramic-deposited-layers 22, 32 and the laser discharge tube 1 is minimized and thus the ceramic-deposited-layers 22 and 32 are not separated by the thermal strain. Therefore, the life of the laser discharge tube 1 is also greatly improved in this point.

Further, the heat-dissipating property and insulating property of the electrodes 21 and 31 can be improved by using a material having a high coefficient of thermal conductivity and a high insulating property for the ceramic-deposited-layers 22 and 32, so that a conventionally restricted power to be supplied (electric power to be supplied to the laser discharge tube) can be increased. When the same electric power is supplied, a laser oscillation output obtained from the laser discharge tube of the present invention increased by about 15% from a conventional output of, for example, 1570 W to 1770 W due to the improvement of the heat-dissipating property. The insulating property between the electrodes is increased by five times. The ceramic-deposited-layers 22 and 32 can endure a supplied power generating a temperature up to 400° C. Further, they can endure a rapid cooling/heating test from −200° C. to 400° C. Furthermore, even if ceramic-deposited-layers 22 and 32 are partially heated to 1500° C., they can keep a function to return to their original state.

Although the aluminium titanate and boron nitride are used as the ceramic material having a negative coefficient of thermal expansion in the above description, other ceramic materials such as, for example, lead titanate may be used.

Further, although the aluminium titanate and boron nitride are mixedly used, any one of them may be used.

The same effect can be obtained by using a ceramic material having a low coefficient of thermal expansion, in addition to the ceramic material having a negative coefficient of thermal expansion.

Further, a ceramic material mainly comprising, for example, titanium composite oxide (TiO, $AL_2TiO_5$, $MgTiO_3$, etc.) or a composite ceramic material comprising the titanium composite oxide, and alumina, magnesia, boron nitride and/or the like may be used as a ceramic type paint. In this case, silicon or tyranno-polymer (trade mark, Si-C) may be used as a binder in addition to the above lead oxide. When the composite ceramic material comprising the titanium composite oxide, and alumina, magnesia, boron nitride, and/or the like is used, a ceramic material exhibiting a low coefficient of thermal expansion and high coefficient of thermal conductivity can be obtained by regulating the combination of the titanium composite oxide with the alumina, magnesia, boron nitride and/or the like.

Further, although silver is used for the electrodes in the above description, the electrodes may comprise of other conductive material (e.g., gold).

As described above, according to the present invention, since the dielectric material is deposited on the electrodes of the laser discharge tube, the electrodes are completely covered with the dielectric layers thereof. a result, air gaps conventionally interposed between the electrodes and the outside periphery of the tube wall are removed and there is no chance for corona discharge exited by the air gaps to take place and, in addition, the function of the air gaps returns to their original state. Therefore, the flow out of the electrode material, deterioration of the electrodes, and the like can be prevented. Further, the characteristics of the electrodes do not deteriorate (change) since the vicinity of the electrodes is not covered with the flown out silver, and thus the life of the electrodes can be prolonged. Further, since the heat-dissipating property and insulating property of the electrodes can be improved by using a material having a high coefficient of heat conductivity and high insulating property as the dielectric layers, a conventionally restricted power to be supplied to the laser discharge tube can be increased.

We claim:

1. A laser discharge tube, containing a laser gas, for inducing a discharge in response to a high-frequency voltage applied thereto to excite the laser gas, said laser discharge tube comprising:
   electrodes disposed on an outside periphery of the laser discharge tube; and
   dielectric layers deposited on said electrodes, said dielectric layers being ceramic-deposited layers comprising a ceramic material having one of a low coefficient of thermal expansion and a negative coefficient of thermal expansion, and a binder which is a low melting point glass.

2. The laser discharge tube according to claim 1, wherein said ceramic material is a titanium composite oxide.

3. The laser discharge tube according to claim 2, wherein said titanium composite oxide is one of aluminum titanate and lead titanium.

4. The laser discharge tube according to claim 1, wherein said ceramic material is boron nitride.

5. The laser discharge tube according to claim 1, wherein said ceramic material is titanium composite oxide and boron nitride.

6. The laser discharge tube according to claim 1, wherein said ceramic-deposited-layers are mixed with one of silicon nitride and silicon carbide.

7. The laser discharge tube according to claim 1, wherein said binder has a mixing ratio of 50–90 wt %.

8. The laser discharge tube according to claim 1, wherein said ceramic-deposited layers are deposited on said electrodes by one of spray coating, coating and vapor deposition.

9. The laser discharge tube according to claim 1, wherein said ceramic-deposited layers comprise a material having a low coefficient of thermal expansion and a high coefficient of thermal conductivity.

10. The laser discharge tube according to claim 1, wherein said ceramic-deposited layers are independently formed and deposited by bonding.

11. The laser discharge tube according to claim 1, wherein said ceramic-deposited layers comprise a material having a high flowing property at a temperature above a melting point temperature of the material, and have a function to return to their original state.

12. The laser discharge tube according to claim 1, wherein said ceramic-deposited layers comprise a material having a melting point temperature lower than that of said electrodes and higher than a heat resistant temperature required by the discharge.

13. The laser discharge tube as claimed in claim 1, wherein said ceramic-deposited layers have a substantially equal coefficient of thermal expansion as that of the laser discharge tube.

14. The laser discharge tube as claimed in claim 1, wherein said electrodes are helically shaped about the outside periphery of the laser discharge tube.

15. A laser discharge tube, containing a laser gas, for inducing a discharge in response to a high-frequency voltage applied thereto to excite the laser gas, said laser discharge tube comprising:
   electrodes disposed on an outside periphery of the laser discharge tube; and
   dielectric layers deposited on said electrodes, said dielectric layers being ceramic-deposited layers comprising one of a titanium composite oxide and a composite ceramic material of titanium composite oxide, and magnesia, alumina.

16. The laser discharge tube according to claim 15, wherein tyranno-polymer (Si-C) is used as a binder to said ceramic-deposited layers.

* * * * *

UNITED STATES PATENT AND TRADEMARK OFFICE
CERTIFICATE OF CORRECTION

PATENT NO. : 5,379,316            Page 1 of 2
DATED : January 3, 1995
INVENTOR(S) : Karube et al It is certified that error appears in the above-indentified patent and that said Letters Patent is hereby corrected as shown below:

Column 3, line 3, after "tube" delete "I" and insert --1--.

Column 3, line 36, delete "materiaL" and insert --material--, and delete "Like" and insert --like--.

Column 3, line 37, delete "like" and insert --like--.

Column 3, line 45, after "comprising" delete "of".

Column 3, line 53, after "and" insert --31--.

UNITED STATES PATENT AND TRADEMARK OFFICE
CERTIFICATE OF CORRECTION

PATENT NO. : 5,379,316
DATED : January 3, 1995
INVENTOR(S) : Karube et al

It is certified that error appears in the above-indentified patent and that said Letters Patent is hereby corrected as shown below:

Column 4, line 60, after "invention" insert --is--.

Column 5, line 35, after "thereof." insert --As--.

Signed and Sealed this

Fourth Day of July, 1995

Attest:

BRUCE LEHMAN

*Attesting Officer*  *Commissioner of Patents and Trademarks*